Jan. 13, 1931.                C. H. BUSHNELL                1,788,703
                              FUEL INJECTION VALVE
                              Filed July 6, 1925
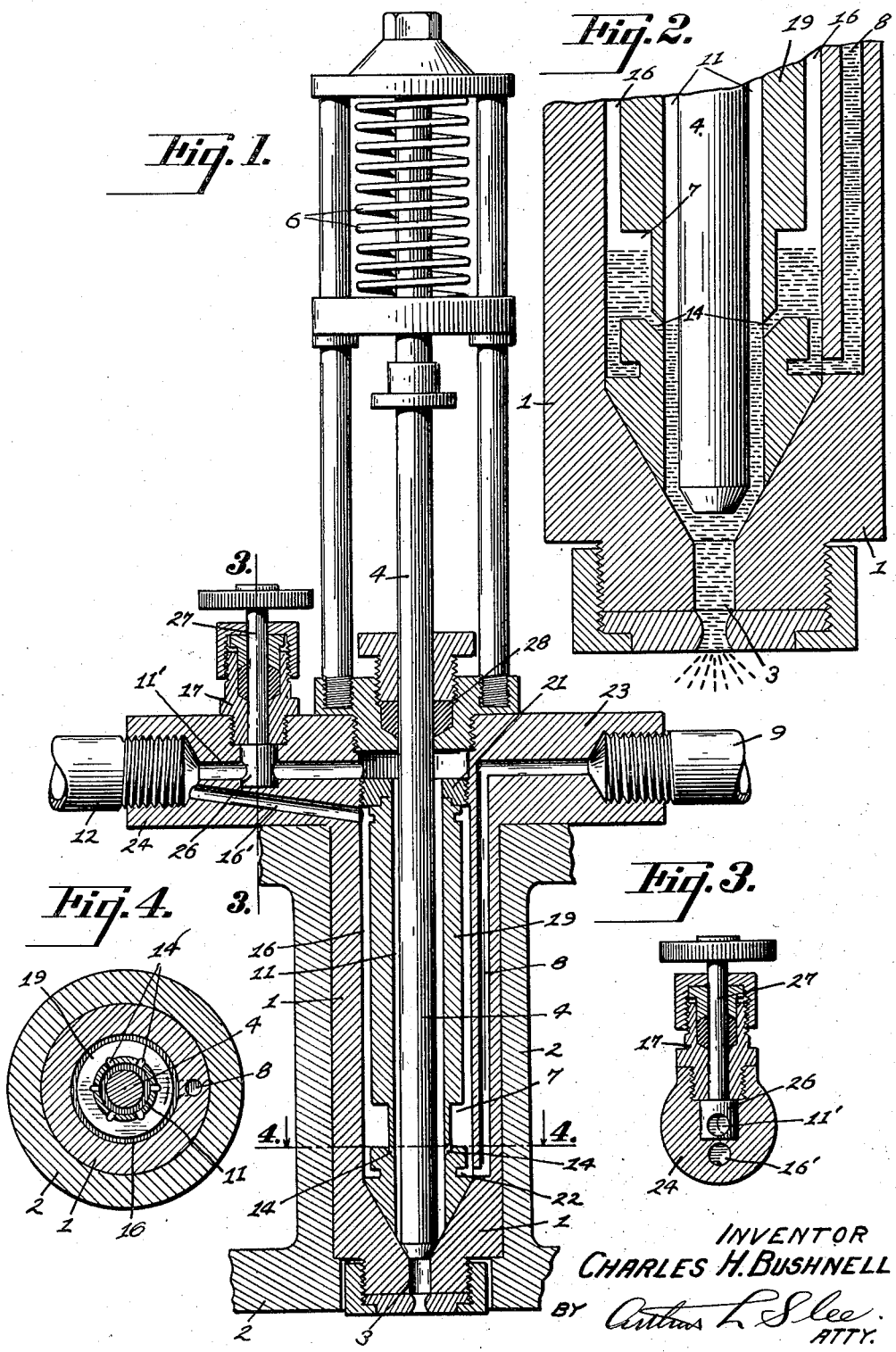
INVENTOR
CHARLES H. BUSHNELL
BY Arthur L. Slee
ATTY.

Patented Jan. 13, 1931

1,788,703

UNITED STATES PATENT OFFICE

CHARLES H. BUSHNELL, OF SAN FRANCISCO, CALIFORNIA

FUEL-INJECTION VALVE

Application filed July 6, 1925. Serial No. 41,690.

My invention relates to improvements in fuel injecting valves for injecting measured quantities of fuel into the cylinders of internal combustion engines of the Diesel types.

In injecting fuel into the cylinders of Diesel engines and the like, the common practice is to pump fuel oil into a reservoir formed within the fuel valve of each cylinder from which reservoir the oil is forced by air under high pressure into the cylinder. The fuel is displaced from the reservoir by means of an unbalanced pressure obtained by directing the full air pressure upon the oil in the reservoir by means of a by-pass while the main air passage passing the outlets of the reservoir is slightly restricted to obtain a slightly reduced pressure upon the outlet side of the reservoir, the fuel being displaced from the reservoir by the differential pressure resulting from thus restricting the main air passage.

Heretofore the differential pressure thus produced is not variable but remains fixed as to any particular valve. The degree to which the pressure within the air passage is reduced depends, of course, upon the degree to which the passage is restricted, and determines the speed with which the fuel is discharged from the reservoir into the cylinder. While valves may be designed to meet the requirements of various characters and grades of fuel, no regulation or adjustment is afforded for adjusting the valves to the requirements of a fuel other than the fuel for which the valve is primarily designed.

To obtain the most efficient operation of an engine of this type, it has been found that the fuel should be injected into the cylinder during a period of substantially fifteen degrees of piston or crank shaft movement. Should a fuel lighter than that for which the valve has been designed be used, the oil will be displaced more rapidly than desired and the injection into the cylinder will occur during an interval less than that above mentioned with the result that a less perfect mixture with air will be obtained and the efficiency of the engine will be reduced. On the other hand, should a heavier fuel be adopted, the displacement of the oil from the reservoir will be slower and the injection will be prolonged over a longer period of time, and may even result in a failure to discharge the entire charge of oil from the reservoir during the period the fuel valve is open. For this reason, a change in the grade or character of fuel used results in material loss in efficiency, or else requires that an entirely new set of valves be substituted.

The primary object of my present invention is therefore to provide an improved fuel valve which is adjustable to various characters and grades of fuel.

Another object is to provide an improved valve of the character described which may be adjusted while the engine is in operation.

A further object is to provide an improved valve by which the period required to inject a charge of fuel may be regulated to meet varying conditions and requirements.

I accomplish these and other objects by means of the device disclosed in the drawings forming a part of the present specification wherein like characters of reference are used to designate similar parts throughout said specification and drawings and in which, Fig. 1 is a vertical section of one embodiment of my improved fuel injecting valve.

Fig. 2 is an enlarged sectional detail of the lower end of the valve showing the manner in which the fuel is discharged when the valve is opened.

Fig. 3 is a sectional detail of the air pressure regulating means taken upon the line 3—3 of Fig. 1.

Fig. 4 is a section taken upon the line 4—4 of Fig. 1 in the direction indicated.

Referring to the drawings, my improved valve will be seen to consist of a body 1 adapted to be fitted into the cylinder head 2 of an internal combustion engine of the Diesel type. The body 1 has a port 3 formed in the lower end thereof to open into a cylinder of an engine. A valve stem 4 is slidably mounted within the body and arranged to normally close the port 3, said stem being held in closed position by a spring 6 and adapted to be operated by a rocker arm or other suitable actuating mechanism, not shown, in the well known manner.

A fuel reservoir 7 is formed within the body 1 of the valve, said reservoir being arranged to receive a charge of fuel oil introduced thereinto through a fuel passage 8 formed in the body 1 and connected to the fuel pump, not shown, through a suitable tubular connection 9.

A main air passage 11 is formed in the body of the pump around the valve stem 4, said passage being connected to a source of air under pressure through a tubular connection 12. A plurality of outlet openings 14 communicate between the reservoir 7 and the air passage 11 whereby the fuel may be displaced from the reservoir into the air passage and thence discharged into the engine cylinder through the port 3 as hereinafter more fully explained.

An air by-pass 16 is formed within the body 1 of the fuel valve and arranged to communicate with the top of the reservoir 7 whereby air pressure may be directed into said reservoir to displace the oil therefrom through the outlet openings 14.

The main air passage 11 is arranged to be restricted at a convenient point between the openings 14 and the inlet to the by-pass 16 by means of a suitable valve 17 or other device for regulating the area of the passage at such point.

The body 1 of the fuel valve may be constructed in a great number of different ways to form the reservoir and passage above described. For purposes of illustration I have shown one efficient construction wherein the body 1 has a longitudinal bore terminating in a conical seat arranged to receive the end of the valve stem 4 to close the port 3 through the bottom of the body. A tubular member 19 has its lower end seated upon the conical bore and its upper end engaged by a plug 21 threaded into the upper end of the body 1, the inner and outer surfaces of the tubular member 19 being spaced from the adjacent surfaces of the stem 4 and the body 1 to form the air passage 11 and the by-pass 16. The reservoir 7 is formed by an annular groove formed upon the outer surface of the tubular member. The fuel passage 8 consists of a longitudinally disposed bore formed in the body 1 having its lower end opening opposite an annular groove 22 formed upon the outer surface of the tubular member 19 just below the reservoir 7 and its upper end communicating with a bore formed in a lateral extension 23 formed upon the upper end of the body 1 and arranged to receive the fuel connection 9.

The air connection 12 is connected to a lateral extension 24 arranged opposite the extension 23 and having bores 11' and 16' communicating with and forming continuations of the air passage and by-pass respectively. The air regulating valve 17 consists of a suitable plug valve mounted upon the extension 24 and having an apertured plug 26 adapted to be turned by means of an outwardly extending stem 27 whereby the area of the passage 11' may be restricted to any desired degree.

The stem 4 extends outwardly through the top of the body 1 through a suitable stuffing gland 28 mounted upon the top thereof.

In operation the valve is connected to a cylinder of a Diesel engine and the stem 4 arranged to be moved to open the port 3 at predetermined intervals in the well known manner. When so connected fuel is pumped through the fuel passage 8 to fill the reservoir 7 during the time the valve stem 4 remains in closed position, the fuel being pumped into the reservoir in the ordinary manner against the pressure of the air within the passage 11 and by-pass 16. So long as the stem 4 remains in closed position the pressure within the passages 11 and 16 remains equal and the fuel is retained within the reservoir.

At the moment the valve stem 4 is lifted to open the port 3, the air pressure is admitted to the cylinder. In order to displace the fuel from the reservoir and to cause it to be carried into the cylinder with the air, the pressure within the main air passage 11 is caused to be slightly reduced by restricting the area of the passage. In the present invention, this restriction is obtained at the control valve 17 which is operated to restrict the passage 11 until the pressure of air moving therethrough to the cylinder is a desired amount lower than the pressure within the by-pass 16, the difference in pressure thus obtained operating to force the fuel from the reservoir 7 through the openings 14 and into the passing stream of air in the passage 11 by which it is carried and discharged into the cylinder as best shown in Fig. 2 of the drawings. By means of the valve 17 the restriction may be regulated to obtain a differential pressure between the passages 11 and 16 adapted to meet the requirement of any particular fuel. Thus when heavy fuel is being used the valve may be adjusted to restrict the passage 11 to a greater degree and thus obtain a greater differential pressure than required when a light fuel is being used. By a careful adjustment of the valve 17 the fuel valve may thus be regulated to give the highest possible efficiency from any particular fuel, such adjustment being easily made while the engine is in operation and thus permitting the proper setting to be obtained by comparison of successive power indicator diagrams.

As above stated, the specific form and construction of my invention is subject to modification in a great number of ways. I therefore do not wish to restrict myself to the specific form and construction illustrated in the drawings, but desire to avail myself of all modifications which may fall within the scope of the appended claims.

Having thus described my invention what I claim as new and desire to secure by Letters Patent is,

1. A fuel injection valve comprising a body arranged to be mounted in connection with a cylinder of an internal combustion chamber and having a port communicating with said cylinder; a valve mounted upon the body and arranged to be operated to alternately open and close the port; an injecting air passage surrounding the valve and connected to a source of air pressure; a reservoir formed within the body and having outlets opening into the injecting air passage and having an inlet passage for introducing fuel into the reservoir; an air by-pass formed within the body and communicating between the injecting air passage and the reservoir to direct air pressure onto the fuel in the reservoir to displace said fuel through the outlets into the injecting air passage; and a regulating valve mounted in connection with the injecting air passage between the by-pass connection and the reservoir outlets for restricting the injecting air passage and reducing the pressure of air passing through the injecting passage relative to the pressure through the by-pass to produce an unbalanced pressure upon the fuel whereby fuel is displaced into the flow of injecting air past the reservoir outlets when the fuel valve is open, the period of fuel injection being regulated by the degree of restriction of the injecting air passage.

2. In a fuel valve, the combination with a body having an air passage, a reservoir adapted to receive a measured charge of fuel and having an outlet opening into the air passage, and an air by-pass communicating with the reservoir and opening into the air passage at a point between the reservoir outlet and a source of air pressure, of adjustable means for restricting the air passage independently of the by-pass to obtain an unbalanced pressure upon fuel within the reservoir relative to the pressure in the air passage at the reservoir outlet whereby said fuel may be displaced from the reservoir into the air passage at a rate and during a period regulated by said adjustable restricting means.

3. In a fuel valve, the combination with a body having an air passage, a reservoir adapted to receive a measured charge of fuel and having an outlet opening into the air passage, and an air by-pass communicating with the reservoir and opening into the air passage at a point between the reservoir outlet and a source of air pressure, of an adjustable valve mounted in connection with the air passage to restrict said passage independently of the by-pass to obtain an unbalanced pressure upon fuel within the reservoir relative to the pressure in the air passage at the reservoir outlet whereby said fuel may be displaced from said reservoir at a rate and during a period regulated by said valve.

4. In a fuel valve, a body having a port opening into a cylinder of an internal combustion engine; valve means for alternately opening and closing said port; an air passage communicating with the port and connected to a source of air pressure; a reservoir adapted to receive a measured charge of fuel and having an outlet opening into the air passage; an air by-pass communicating with the reservoir and opening into the air passage between the reservoir outlet and the source of air pressure; and a valve operable to restrict the air passage at a point between the air by-pass and the reservoir outlet independently of the pressure within the by-pass to obtain an unbalanced pressure upon fuel within the reservoir relative to the pressure in the air passage at the reservoir outlet whereby the fuel may be displaced from the reservoir and injected into the engine, said valve being adjustable while the engine is in operation to vary the degree of restriction and thereby regulate the rate at which the fuel is displaced and the period during which said fuel is injected.

5. A fuel injection valve comprising a body arranged to be mounted in connection with a cylinder of an internal combustion engine and having a port communicating with said cylinder; a valve mounted upon the body and arranged to be operated to alternately open and close the port; an air passage formed in the body to communicate with the port and arranged to be connected to a source of air pressure; a reservoir formed within the body and having an outlet communicating with the air passage; a fuel inlet passage opening into the reservoir for introducing fuel into the reservoir; an air by-pass formed within the body to communicate between the air passage and the reservoir, said by-pass and the air passage being arranged to carry air under high pressure for injecting the fuel into the cylinder; and means for regulating the air pressure within the air passage independently of the pressure within the by-pass to obtain an unbalanced pressure upon fuel within the reservoir relative to the pressure in the air passage at the reservoir outlet whereby fuel may be displaced from said reservoir into the air passage and injected through the port into the cylinder when the valve is opened.

6. A fuel injection valve comprising a body arranged to be mounted in connection with a cylinder of an internal combustion engine and having a port communicating with said cylinder; a fuel valve mounted within the body and arranged to be operated to alternately open and close the port; an air passage formed in the body to communicate with the port and arranged to be connected to a source of air pressure; a fuel reservoir formed within the body and having an outlet communicating with the air passage and having a fuel inlet for introducing fuel into the reservoir; an air by-pass formed within the body to communicate between the air passage and the reservoir, said air passage being arranged to carry air under high pressure past the reservoir outlet and said by-pass being adapted to direct air pressure from the same source into the reservoir for injecting the fuel from the reservoir into the cylinder; and an air control valve mounted in connection with the air passage for regulating the pressure within said air passage independently of the pressure within the by-pass to obtain an unbalanced pressure upon fuel within the reservoir relative to the pressure within the air passage at the reservoir outlet whereby fuel may be displaced from the reservoir into the air passage to be injected through the port into the cylinder when the fuel valve is open.

In witness whereof I hereunto set my signature.

CHARLES H. BUSHNELL.